(No Model.)
P. E. JAY.
PROCESS OF AND APPARATUS FOR AGING WHISKY.
No. 296,836. Patented Apr. 15, 1884.
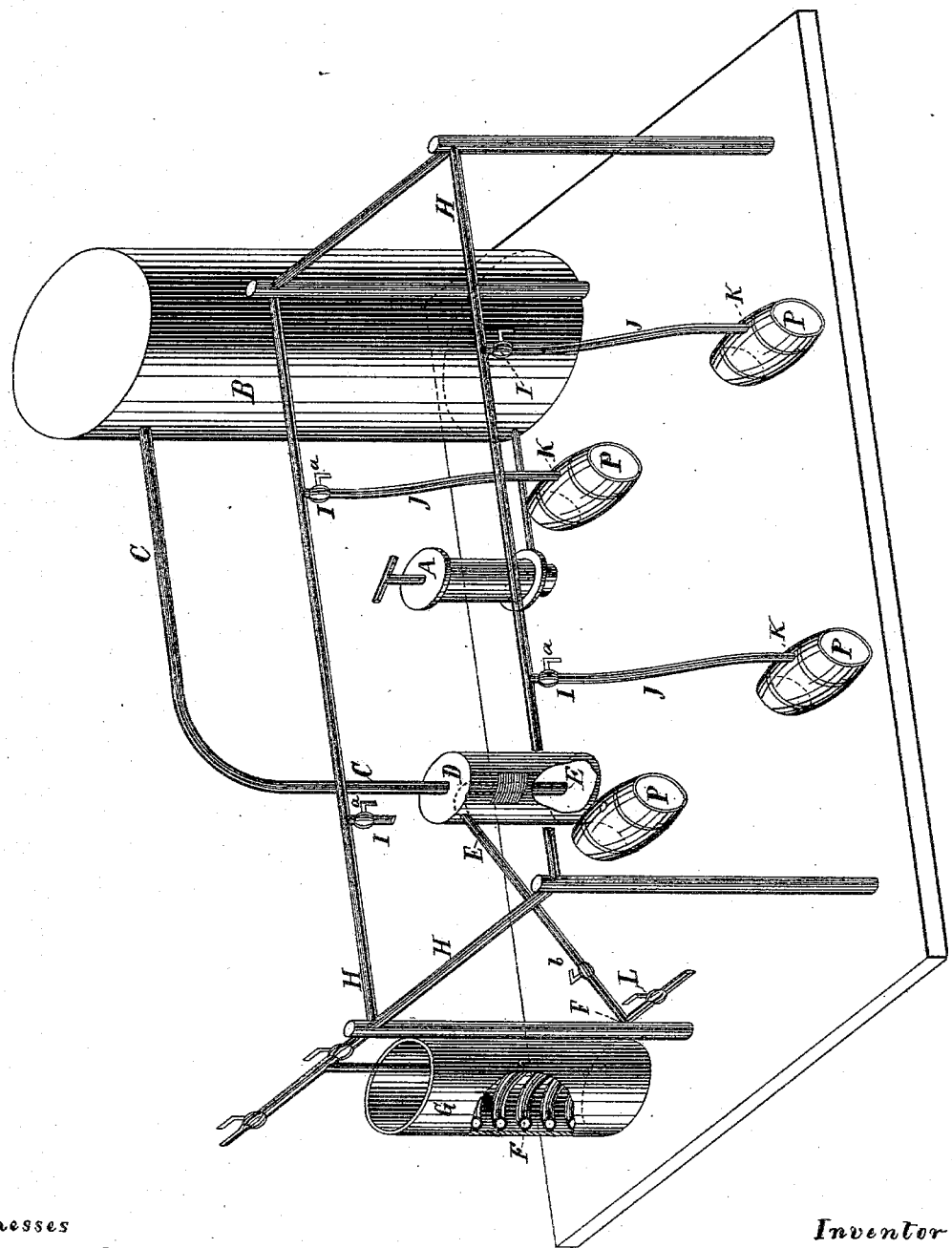
Witnesses
James A. Patrick
Josiah T. Lovejoy
Inventor
Pierre E. Jay
per James A. Whitney
Attorney

UNITED STATES PATENT OFFICE.

PIERRE EYMARD JAY, OF NEW YORK, N. Y., ASSIGNOR TO JAY & CO., OF SAME PLACE.

PROCESS OF AND APPARATUS FOR AGING WHISKY.

SPECIFICATION forming part of Letters Patent No. 296,836, dated April 15, 1884.

Application filed May 15, 1883. (No model.)

*To all whom it may concern:*

Be it known that I, PIERRE EYMARD JAY, of the city, county, and State of New York, have invented certain Improvements in Process of and Apparatus for Aging Whiskies and other Liquors, of which the following is a specification.

The object of this invention is to give to whiskies and other similar liquors the properties ordinarily afforded them by keeping for considerable periods of time, and which is commonly termed "aging."

The invention comprises certain novel means whereby the requisite amount of tannic acid is afforded to the liquor, as in the ordinary long storage of the latter in oaken casks, and for the removal of the fusel-oil from the liquor, as ordinarily occurs only by the slow evaporation permitted by time, and for the relative diminution of the hydrogen and oxygen as compared with the carbon in the composition of the liquor, which characterizes a ripened or aged liquor, as compared with a new liquor in which the alcohol is crude or unchanged; and also whereby the waste of the liquor heretofore incident both to the ordinary processes of aging by lapse of time and by those known as "quick methods" is avoided.

The drawing is a perspective view and partial section of an apparatus included in my said invention.

A is an air-exhausting pump, and B is a "receiver," so termed, in which the vacuum is produced by the action of the air-pump A. The receiver B communicates by a pipe, C, with a tank, D, the lower end of the pipe C entering the top thereof. From the top of the tank D extends a pipe, E, which connects with the lower end of a condensing-worm, F, the latter being placed in a suitable water-tank, G, in order that the requisite low temperature of the said worm may be maintained. The upper end of the worm connects with any desired number of pipes H, which in their turn are provided with any desired number of nozzles I, each adapted to receive the end of a tube, J, the lower end of which, by means of a suitable tubular connection, K, communicates with the interior of a cask, P, containing the liquor to be treated. Each of the nozzles I is provided with a suitable stop-cock, $a$, by which communication may be closed or opened, as occasion requires, between the cask or barrel and the pipe H. In the tank D is placed any suitable deliquescent salt—that is to say, any salt or material capable of readily absorbing and retaining the uncondensed vapors which may remain in what is drawn from the casks and passed through the worm, as herein presently explained.

In the operation of the apparatus the air-pump is actuated to produce a vacuum in the receiver, which in its turn draws the vapors from the contents of the casks or barrels through the tubes J and pipes H, worm F, pipe E, tank D, pipe C, into said receiver. Under the action of the partial vacuum induced in each of the casks by the operation hereinbefore explained, the tannin contained in the oak wood of which the casks are made is rapidly given up to the liquor contained in the casks, while the fusel-oil contained in the liquor is absorbed by the oak wood. During the operation aforesaid the principal condensable products withdrawn from the contents of the cask are contained in the worm F, and may be drawn off at intervals therefrom through a cock, L, arranged at the lower end of the said worm. In order that the vacuum in the receiver may not be destroyed during the withdrawal of the condensed contents of the worm, the pipe E is provided with a stop-cock, $b$, which may be turned to close the said pipe as occasion requires.

I am aware of a process of treating vinous liquors in wooden vessels in a vacuum, and I do not herein claim the use of such process for such liquors.

I am also aware of a process of treating spirituous liquors in metal vessels in a vacuum, and I do not herein claim the use of such process in such vessels.

I am also aware of a process of treating spirituous liquors by subjecting them to the action of shavings in a vacuum, and I do not herein claim the use of such process.

What I claim as my invention is—

1. The herein-described process of aging whisky and similar liquors in oaken casks by subjecting them to the action of a vacuum in the said casks and condensing the resultant vapor, substantially as and for the purpose herein set forth.

2. The combination of one or more casks for containing the liquor to be aged, a condensing-worm communicating with the interior of the said cask, a tank containing a suitable deliquescent salt or material, a pump, receiver, and suitable tubular connections for insuring a vacuum within the said tank, condensing-worm, and cask, all substantially as and for the purpose herein set forth.

3. The combination of an air-pump A, receiver B, pipe C, tank D, pipe E, having stop-cocks b, condensing-worm F, having discharge-cock L, pipe or pipes H, nozzles I, having stop-cocks a, for connecting the pipes H with the casks containing the liquor to be treated, all substantially as and for the purpose herein set forth.

PIERRE EYMARD JAY.

Witnesses:
JAMES A. WHITNEY,
JNO. J. DUNN.